# 3,096,347
N-CARBETHOXY AMINOACID 5-NITROFUR-FURYLIDENE HYDRAZIDES
George C. Wright, Norwich, N.Y., assignor to The Norwich Pharmacal Company, a corporation of New York
No Drawing. Filed Dec. 6, 1961, Ser. No. 157,543
4 Claims. (Cl. 260—347.5)

This invention relates to novel chemical compounds having the formula:

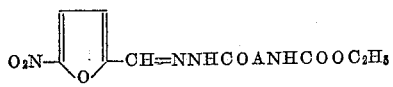

wherein A represents a straight or branched, optionally substituted, lower alkylene group; for instance, —CH$_2$—; —CH$_2$CH$_2$—; and

These compounds are readily prepared, crystalline solids having greater solubility in organic solvents than in water. They are anti-microbially active both in vitro and in vivo and may be employed as the active ingredient in compositions aimed at the control of microorganisms such as *Staphylococcus aureus*, *Salmonella typhosa*, *Escherichia coli*, *Proteus vulgaris*, *Streptococcus pyogenes*, *Eimeria tenella* and *Histomonas meleagridis*. When administered in the diet to poultry at a level of from about 0.011 to 0.022% by weght, the serious diseases, cecal coccidiosis and histomoniasis caused by *Eimeria tenella* and *Histomonas meleagridis* are effectively combatted.

The new compounds may be readily prepared by reacting the appropriate N-carbethoxy aminoacid hydrazide with 5-nitro-2-furaldehyde or a functional derivative thereof as represented by the following equation:

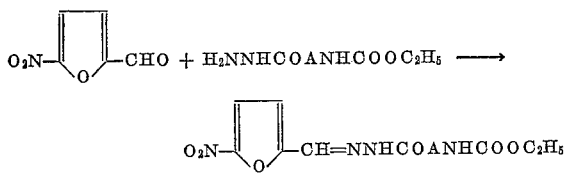

wherein A has the significance ascribed above. The aminoacid hydrazides are simply prepared by bringing together a lower alkyl ester of the aminoacid and hydrazine.

In the preparation of these compounds the N-carbethoxy aminoacid lower alkyl ester, for instance, the ethyl ester, is admixed with an equimolar amount of hydrazine hydrate in a solvent such as ethanol and the mixture allowed to stand until reaction is considered complete. To hasten the reaction heat may be supplied to the mixture. After the reaction is complete, the product is recovered from the mixture in conventional fashion; e.g., concentration under reduced pressure followed by recrystallization of the residue from suitable media such as a mixture of ether and ethanol or filtration of deposited solid followed by recrystallization.

The aminoacid hydrazides obtained in accordance with the foregoing teaching are dissolved in a suitable reaction medium such as water, ethanol or mixtures thereof and treated with 5-nitrofuraldehyde preferably dissolved in a compatible solvent such as ethanol. The admixing of the aminoacid hydrazide and 5-nitrofuraldehyde to bring about their interaction is conveniently performed at ambient temperature though elevated temperatures may be employed to speed up the process. The crystalline product obtained by the interaction of the reactants is filtered from the reaction mixture and may be recrystallized in conformity with usual practice using suitable solvents such as ethanol and nitromethane and a clarification agent such as charcoal.

In order that this invention may be readily available to and understood by those skilled in the art the following illustrative examples are appended:

EXAMPLE I

*N-Carbethoxyglycine 5-Nitrofurlylidenehydrazide*

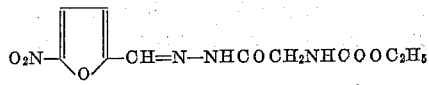

(A) N-CARBETHOXYGLYCINE HYDRAZIDE

A solution of N-carbethoxyglycine ethyl ester, 228 g. (1.30 mole), in 130 ml. (2.60 mole) of N$_2$H$_4$·H$_2$O and 845 ml. of ethanol, is allowed to stand at room temperature for 5 days. The solution is evaporated to dryness under reduced pressure. The residue is recrystallized from a mixture of 120 ml. of ethanol and 180 ml. of ether. The product, N-carbethoxyglycine hydrazide, air dried overnight, melts at 73–77° C. yield: 166 g. (79%).

(B) N-CARBETHOXYGLYCINE 5-NITROFURFURYLI-DENEHYDRAZIDE

To a solution of the above hydrazide, 40.5 g. (0.25 mole), in an aqueous mixture of 100 ml. of 50% ethanol, is gradually added at room temperature, a solution of 5-nitrofuraldehyde, 35.0 g. (0.25 mole), in alcohol. A yellow, crystalline solid is deposited. The solid is collected and washed with five 30 ml. portions of 70% alcohol. The crude product, N-carbethoxygylcine 5-nitrofurfurylidenehydrazide, 66.2 g. (93%), melts at 174–176° C. After recrystallization from 3600 ml. of ethanol there are obtained, 58.6 g. (82%) melting at 176–177° C.

EXAMPLE II

*N-Carbethoxy-β-Alanine 5-Nitrofurfurylidenehydrazide*

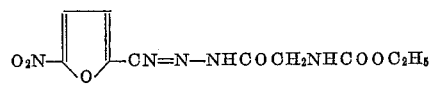

(A) N-CARBETHOXY-β-ALANINE HYDRAZIDE

A solution of N-carbethoxyalanine ethyl ester, 284 g. (1.5 mole), in 170 ml. (3.40 mole) of N$_2$H$_4$·H$_2$O and 2550 ml. of ethanol is refluxed for 57 hrs. The reaction solution is evaporated under reduced pressure. The crystalline residue is dissolved in a mixture of 200 ml. of ether and 130 ml. of ethanol, and cooled in an ice bath. The resultant white crystalline solid mixture is treated with 250 ml. of ether and 25 ml. of alcohol. The wet solid, treated further with 900 ml. of ether, is filtered and washed with 725 ml. of ether. After air-drying for 3 days, the product, N-carbethoxy-β-alanine hydrazide, 188 g. (71%), melts at 70–77° C.

(B) N-CARBETHOXY-β-ALANINE 5-NITROFURFURYLI-DENEHYDRAZIDE

To a solution of the above hydrazide, 44.0 g. (0.25 mole), in 85 ml. of water, is gradually added at room temperature a solution of 5-nitro-furaldehyde, 33.0 g. (0.23 mole), in 100 ml. of ethanol. A yellow crystalline solid is deposited. The mixture is cooled in an ice bath, and the solid is collected and washed with 50% alcohol, then alcohol and ether. The crude product is recrystallized from 850 ml. of ethanol, containing charcoal. The product, N-carbethoxy-β-alanine 5-nitrofurfurylidenehydrazide, 46.8 g. (63%), melts at 166–168° C.

EXAMPLE III

*N-Carbethoxyserine 5-Nitrofurfurylidenehydrazide*

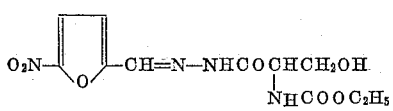

(A) N-CARBETHOXYSERINE HYDRAZIDE

A solution of N-carbethoxyserine ethyl ester, 82.0 g. (0.40 mole), in 40 ml. (0.80 mole) of hydrazine hydrate and 300 ml. of ethanol is allowed to stand at room temperature overnight. A white crystalline solid is deposited. The mixture is cooled, and the white solid was collected and washed with ethanol. The product, N-carbethoxyserine hydrazide, 67 g. (87%) melts at 136–138.5° C.

(B) N-CARBETHOXYSERINE 5-NITROFURFURYLIDENEHYDRAZIDE

To a solution of the above hydrazide, 52 g. (0.27 mole), in 300 ml. of water, was gradually added at room temperature a solution of 5-nitrofuraldehyde, 38.4 g. (0.27 mole), in 150 ml. of ethanol. A yellow crystalline solid is deposited. The mixture is cooled in an ice bath, and the solid is collected and washed with 100 ml. of ethanol. The crude product is recrystallized from 1100 ml. of nitromethane, containing charcoal. The product, N-carbethoxyserine 5-nitrofurfurylidenehydrazide, 73 g. (86%), melts at 143–148° C. Recrystallized from nitromethane, the product, 63.8 g. (75%), melts at 146–149° C.

What is claimed is:

1. A compound of the formula:

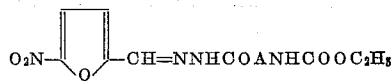

in which A represents a lower alkylene group selected from the group consisting of —$CH_2$—; —$CH_2CH_2$—;

2. The compound having the formula:

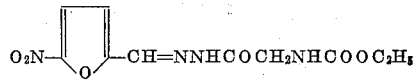

3. The compound having the formula:

4. The compound having the formula:

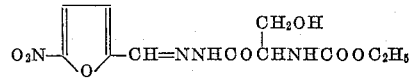

References Cited in the file of this patent
UNITED STATES PATENTS
2,416,234    Stillman et al. _____ Feb. 18, 1947